US012594992B2

(12) United States Patent
Hamaguchi et al.

(10) Patent No.: US 12,594,992 B2
(45) Date of Patent: Apr. 7, 2026

(54) VEHICLE STEERING CONTROL DEVICE

(71) Applicant: TOYOTA JIDOSHA KABUSHIKI KAISHA, Toyota (JP)

(72) Inventors: Takeshi Hamaguchi, Seto (JP); Shusaku Sugamoto, Toyota (JP); Satoshi Handa, Kariya (JP); Satoshi Inoue, Anjo (JP); Shintaro Saigo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/833,166

(22) Filed: Jun. 6, 2022

(65) Prior Publication Data

US 2022/0396310 A1 Dec. 15, 2022

(30) Foreign Application Priority Data

Jun. 9, 2021 (JP) ................................. 2021-096471
Mar. 17, 2022 (JP) ................................. 2022-042666

(51) Int. Cl.
*B62D 15/02* (2006.01)

(52) U.S. Cl.
CPC .................................. *B62D 15/025* (2013.01)

(58) Field of Classification Search
CPC ...... B62D 15/025; B62D 6/008; B62D 5/006; B62D 6/002
See application file for complete search history.

(56) References Cited

U.S. PATENT DOCUMENTS

2004/0107032 A1* 6/2004 Farrelly ................... B62D 6/04
                                                          701/42
2014/0032051 A1* 1/2014 Ezoe ...................... B62D 6/001
                                                          701/42
(Continued)

FOREIGN PATENT DOCUMENTS

CN        110550093 A     12/2019
JP      2005-119539 A      5/2005
(Continued)

OTHER PUBLICATIONS

Office Action issued by the United States Patent and Trademark Office dated May 6, 2025 in U.S. Appl. No. 18/394,039.
(Continued)

*Primary Examiner* — Anne Marie Antonucci
*Assistant Examiner* — Patrick M Brady
(74) *Attorney, Agent, or Firm* — Sughrue Mion, PLLC

(57) ABSTRACT

A vehicle steering control device includes a control device. The control device is configured to control a steering reaction force to be applied to a steering operation performed by a driver of a driver's vehicle, acquire information on a curved road ahead of the driver's vehicle in a traveling direction, set a guide steering operation amount based on the information on the curved road, predict a time at which the driver starts an actual steering operation for driving the driver's vehicle along the curved road as a steering operation start time, and set, based on a difference between the guide steering operation amount and an actual amount of the steering operation, the steering reaction force at a time earlier by a predetermined period than the steering operation start time.

4 Claims, 7 Drawing Sheets

(56) References Cited

U.S. PATENT DOCUMENTS

| | | | |
|---|---|---|---|
| 2015/0225015 A1* | 8/2015 | Takeda | B62D 6/008 |
| | | | 701/41 |
| 2017/0242440 A1* | 8/2017 | Nakada | B62D 15/025 |
| 2018/0009474 A1* | 1/2018 | Akatsuka | B62D 6/008 |
| 2019/0152520 A1 | 5/2019 | Obermüller et al. | |
| 2019/0367075 A1 | 12/2019 | Kodera | |
| 2019/0367082 A1* | 12/2019 | Sugamoto | B60W 50/087 |
| 2021/0155289 A1* | 5/2021 | Nilsson | B62D 15/025 |

FOREIGN PATENT DOCUMENTS

| | | | |
|---|---|---|---|
| JP | 2010-132221 A | 6/2010 | |
| JP | 2015-9761 A | 1/2015 | |
| JP | 2019-209844 A | 12/2019 | |
| JP | 2021-66318 A | 4/2021 | |
| WO | 2014/054625 A1 | 4/2014 | |

OTHER PUBLICATIONS

Communication dated Dec. 16, 2025 from the United States Patent and Trademark Office in U.S. Appl. No. 18/394,039.

\* cited by examiner

FIG. 5

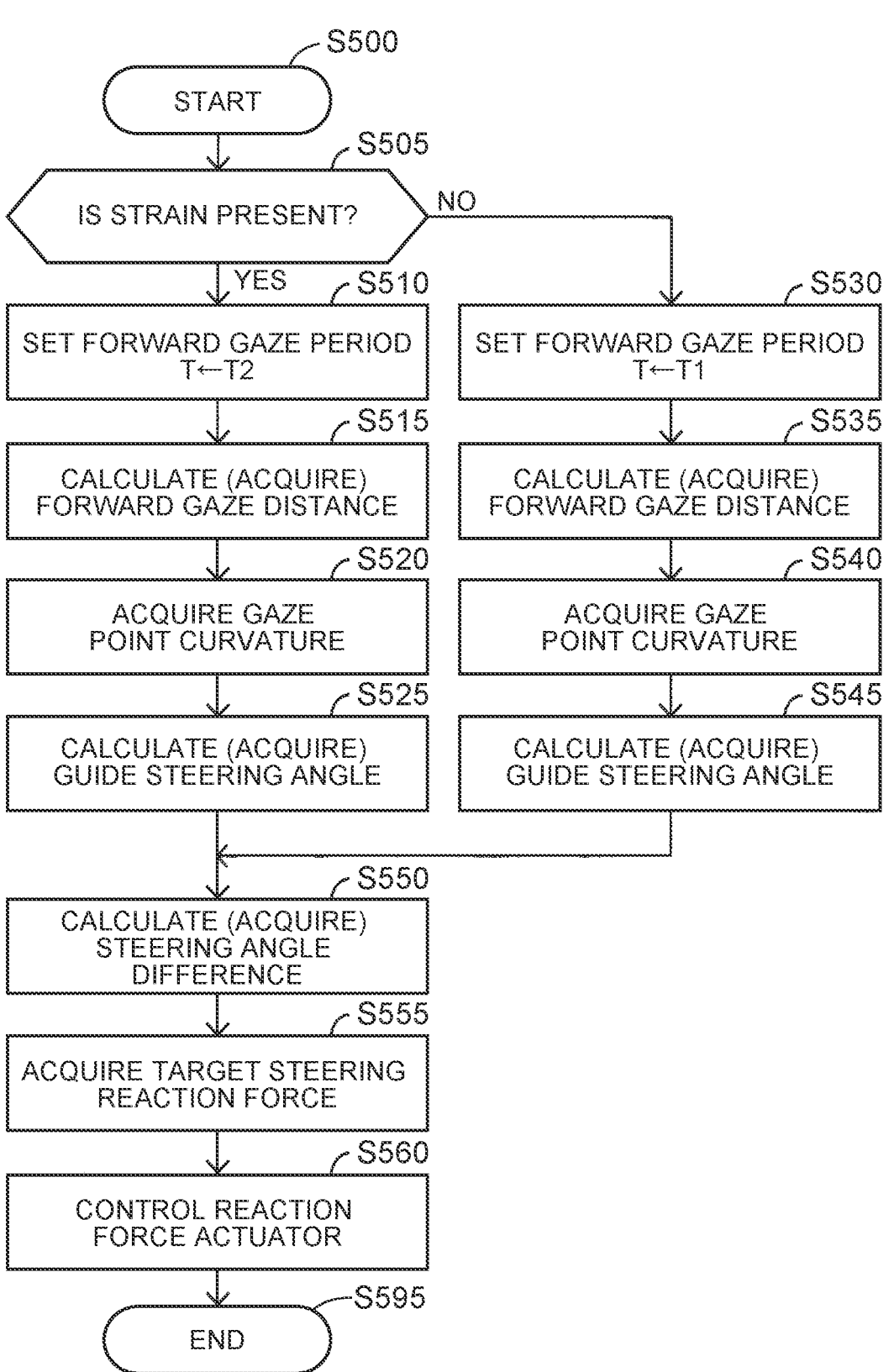

S500

START

S505

IS STRAIN PRESENT?          NO

YES          S510

SET FORWARD GAZE PERIOD
T←T2

S530

SET FORWARD GAZE PERIOD
T←T1

S515

CALCULATE (ACQUIRE)
FORWARD GAZE DISTANCE

S535

CALCULATE (ACQUIRE)
FORWARD GAZE DISTANCE

S520

ACQUIRE GAZE
POINT CURVATURE

S540

ACQUIRE GAZE
POINT CURVATURE

S525

CALCULATE (ACQUIRE)
GUIDE STEERING ANGLE

S545

CALCULATE (ACQUIRE)
GUIDE STEERING ANGLE

S550

CALCULATE (ACQUIRE)
STEERING ANGLE
DIFFERENCE

S555

ACQUIRE TARGET STEERING
REACTION FORCE

S560

CONTROL REACTION
FORCE ACTUATOR

S595

END

VEHICLE STEERING CONTROL DEVICE

CROSS-REFERENCE TO RELATED APPLICATION

This application claims priority to Japanese Patent Application No. 2021-096471 filed on Jun. 9, 2021 and Japanese Patent Application No. 2022-042666 filed on Mar. 17, 2022, each incorporated herein by reference in its entirety.

BACKGROUND

1. Technical Field

The present disclosure relates to a vehicle steering control device.

2. Description of Related Art

There is known a vehicle steering control device that applies a reaction force to a steering wheel operation performed by a driver of a vehicle. This vehicle steering control device adjusts the reaction force to be applied to the steering wheel operation so that the amount of steering wheel operation of the driver falls within an appropriate range when the driver is driving the vehicle along a curved road (see, for example, Japanese Unexamined Patent Application Publication No. 2019-209844 (JP 2019-209844 A)).

SUMMARY

When driving a vehicle along a curved road, the driver rotates the steering wheel clockwise or counterclockwise. When driving the vehicle along a sharply curved road, the driver needs to rotate the steering wheel more quickly than when driving the vehicle along a gently curved road. If the timing to change the reaction force to be applied to the steering wheel operation is constant between the case where the vehicle travels along a sharply curved road and the case where the vehicle travels along a gently curved road, the steering wheel operation delays when the vehicle travels along the sharply curved road. Therefore, there is a possibility that smooth traveling of the vehicle along a curved road cannot be realized.

The present disclosure provides a vehicle steering control device capable of adjusting a timing to change a reaction force to be applied to a steering wheel operation so that a driver can smoothly drive a vehicle along a curved road.

A vehicle steering control device according to a first aspect of the present disclosure includes a control device. The control device is configured to control a steering reaction force to be applied to a steering operation performed by a driver of a driver's vehicle. The control device is configured to acquire information on a curved road ahead of the driver's vehicle in a traveling direction. The control device is configured to set a guide steering operation amount based on the information on the curved road. The control device is configured to predict a time at which the driver starts an actual steering operation for driving the driver's vehicle along the curved road as a steering operation start time. The control device is configured to set, based on a difference between the guide steering operation amount and an actual amount of the steering operation, the steering reaction force at a time earlier by a predetermined period than the steering operation start time.

When the steering reaction force is reduced at the time at which the driver starts the steering operation for driving the driver's vehicle along the curved road (steering operation start time), the driver can easily perform the steering operation for driving the driver's vehicle along the curved road. However, there is a possibility that the steering operation delays and the driver's vehicle cannot suitably travel along the curved road. With the present disclosure, the steering reaction force is reduced at the timing earlier than the steering operation start time. Therefore, even when the degree of curve of the curved road is high, the steering operation for causing the driver's vehicle to travel along the curved road can be performed without delay. As a result, the driver's vehicle can suitably travel along the curved road.

In the vehicle steering control device according to the first aspect of the present disclosure, the control device may be configured to, when a degree of curve of the curved road is high, set the predetermined period to a longer period than a period when the degree of curve of the curved road is low.

When the degree of curve of the curved road is high, the driver needs to perform the steering operation more greatly to drive the driver's vehicle along the curved road. Therefore, there is a strong possibility that the steering operation of the driver delays. With the present disclosure, when the degree of curve of the curved road is high, the predetermined period is set to a long period. Therefore, the steering reaction force is reduced at a timing earlier than the timing at which the driver starts the steering operation for driving the driver's vehicle along the curved road. Thus, it is possible to suppress the delay in the steering operation of the driver.

In the vehicle steering control device according to the first aspect of the present disclosure, the control device may be configured to, when a traveling speed of the driver's vehicle is high, set the predetermined period to a longer period than a period when the traveling speed of the driver's vehicle is low.

When the traveling speed of the driver's vehicle is high, the driver needs to perform the steering operation more quickly to drive the driver's vehicle along the curved road. Therefore, there is a strong possibility that the steering operation of the driver delays. With the present disclosure, when the traveling speed of the driver's vehicle is high, the predetermined period is set to a long period. Therefore, the steering reaction force is reduced at a timing earlier than the timing at which the driver starts the steering operation for driving the driver's vehicle along the curved road. Thus, it is possible to suppress the delay in the steering operation of the driver.

In the vehicle steering control device according to the first aspect of the present disclosure, the control device may be configured to set a target for a change in an amount of the steering operation while the driver's vehicle travels along the curved road. The control device may be configured to limit a maximum value of the guide steering operation amount to a value smaller by a predetermined value than a maximum value of the amount of the steering operation that changes in accordance with the target.

When driving the driver's vehicle along the curved road, the driver increases the amount of the steering operation and then reduces the amount of the steering operation. When the amount of the steering operation approaches the maximum value of the amount of the steering operation defined by the target (target steering operation amount), the amount of the steering operation may exceed this maximum value. With the present disclosure, the maximum value of the guide steering operation amount is limited to the value smaller than the maximum value of the target steering operation amount by the predetermined value. Therefore, when the amount of the steering operation approaches the maximum value of the target steering operation amount, the steering reaction force is increased. Thus, it is possible to reduce the occurrence of a case where the steering operation of the driver exceeds the maximum value of the target steering operation amount.

In the vehicle steering control device according to the first aspect of the present disclosure, the control device may be configured to, when a traveling speed of the driver's vehicle is low, set the predetermined value to a smaller value than a value when the traveling speed of the driver's vehicle is high.

When the traveling speed of the driver's vehicle is high, the speed of the steering operation tends to increase. Therefore, there is a possibility that the driver performs the steering operation too greatly in order to drive the driver's vehicle along the curved road. With the present disclosure, when the traveling speed of the driver's vehicle is high, the predetermined value for reducing the maximum value of the guide steering operation amount below the maximum value of the target steering operation amount is set to a small value. Therefore, when the amount of the steering operation approaches the maximum value of the target steering operation amount in a state in which the traveling speed of the driver's vehicle is high, the degree of increase in the steering reaction force is reduced. Thus, it is possible to appropriately reduce the occurrence of the case where the steering operation of the driver exceeds the maximum value of the target steering operation amount.

In the vehicle steering control device according to the first aspect of the present disclosure, the control device may be configured to, when a degree of curve of the curved road is high, set the predetermined value to a larger value than a value when the degree of curve of the curved road is low.

When the degree of curve of the curved road is high, the driver needs to perform the steering operation more greatly to drive the driver's vehicle along the curved road. Therefore, there is a strong possibility that the amount of the steering operation exceeds the maximum value of the amount of the steering operation defined by the target pattern (target steering operation amount). With the present disclosure, when the degree of curve of the curved road is high, the predetermined value for reducing the maximum value of the guide steering operation amount below the maximum value of the target steering operation amount is set to a large value. Therefore, when the amount of the steering operation approaches the maximum value of the target steering operation amount in the case where the degree of curve of the curved road is high, the degree of increase in the steering reaction force is increased. Thus, it is possible to appropriately reduce the occurrence of the case where the steering operation of the driver exceeds the maximum value of the target steering operation amount.

A vehicle steering control device according to a second aspect of the present disclosure includes a control device. The control device is configured to control a steering reaction force to be applied to a steering operation performed by a driver of a driver's vehicle. The control device is configured to, when a degree of curve of a curved road is high, set the steering reaction force to be applied to the steering operation while the driver's vehicle travels along the curved road to be smaller than the steering reaction force when the degree of curve of the curved road is low.

When the degree of curve of the curved road is high, the driver needs to perform the steering operation greatly to suitably drive the driver's vehicle along the curved road as compared with the case where the degree of curve of the curved road is low. Therefore, when the degree of curve of the curved road is high, there is a possibility that the steering operation of the driver for driving the driver's vehicle along the curved road delays. In that case, there is a possibility that the driver's vehicle cannot suitably travel along the curved road. With the present disclosure, when the degree of curve of the curved road is high, the steering reaction force is set smaller than that when the degree of curve of the curved road is low. Therefore, even when the degree of curve of the curved road is high, the steering operation for causing the driver's vehicle to travel along the curved road can be performed without delay.

In the vehicle steering control device according to the second aspect of the present disclosure, the degree of curve of the curved road may be a minimum curve radius of the curved road. The control device may be configured to, when the minimum curve radius of the curved road is small, acquire a curve radius of the curved road at a farther point ahead of the driver's vehicle than a point when the minimum curve radius of the curved road is large. The control device may be configured to, when the acquired curve radius is small, set the steering reaction force to be smaller than the steering reaction force when the acquired curve radius is large.

When the degree of curve of the curved road is high, there is a possibility that the steering operation of the driver for driving the driver's vehicle along the curved road delays by being hindered by the steering reaction force. In that case, there is a strong possibility that the driver's vehicle cannot suitably travel along the curved road.

With the present disclosure, the steering reaction force is reduced. When the curve radius is small, the steering reaction force is set smaller than that when the curve radius is large. Therefore, even when the degree of curve of the curved road is high, the steering operation for causing the driver's vehicle to travel along the curved road can be performed without delay. As a result, the driver's vehicle can suitably travel along the curved road.

The constituent elements according to the present disclosure are not limited to those according to an embodiment of the present disclosure to be described later with reference to the drawings. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart showing a routine to be executed by the vehicle steering control device according to the embodiment of the present disclosure;

DETAILED DESCRIPTION OF EMBODIMENTS

Figure 1:
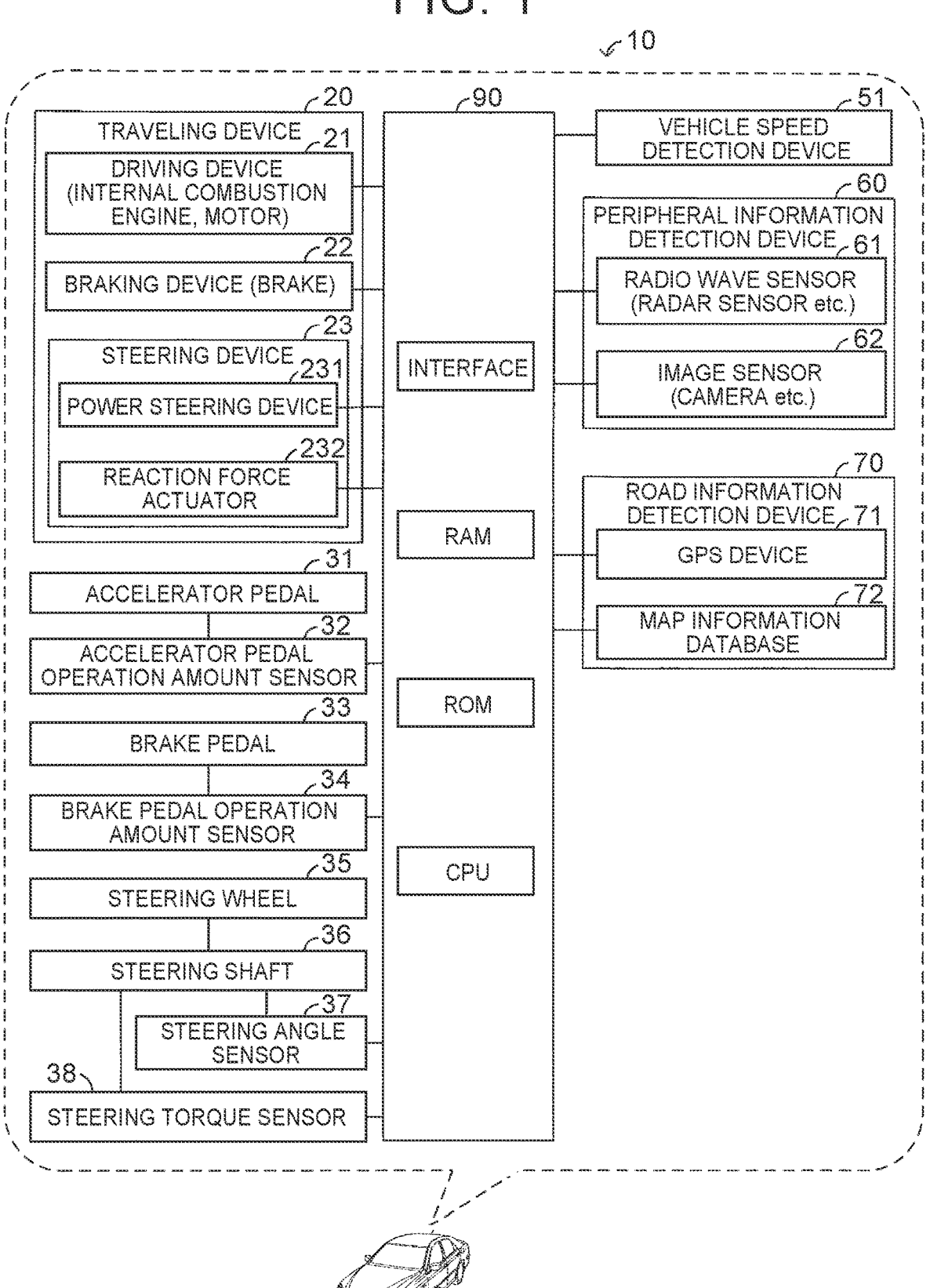
FIG. 1 is a diagram showing a vehicle steering control device according to an embodiment of the present disclosure and a vehicle (driver's vehicle) including the vehicle steering control device.

A vehicle steering control device according to an embodiment of the present disclosure will be described below with reference to the drawings. As shown in FIG. 1, a vehicle steering control device 10 according to the embodiment of the present disclosure is mounted on a driver's vehicle 100. In the following description, a driver of the driver's vehicle 100 is referred to as "driver DR".

ECU

The vehicle steering control device 10 includes an electronic control unit (ECU) 90. The ECU 90 includes a microcomputer as a main component. The microcomputer includes a central processing unit (CPU), a read only memory (ROM), a random access memory (RAM), a nonvolatile memory, and an interface. The CPU executes instructions, programs, or routines stored in the ROM to implement various functions.

Traveling Device

The driver's vehicle 100 includes a traveling device 20. The traveling device 20 includes a driving device 21, a braking device 22, and a steering device 23.

Driving Device

The driving device 21 outputs a driving torque (driving force) to be applied to the driver's vehicle 100 in order to cause the driver's vehicle 100 to travel. Examples of the driving device 21 include an internal combustion engine and a motor. The driving device 21 is electrically connected to the ECU 90. The ECU 90 can control the driving torque to be output from the driving device 21 by controlling operation of the driving device 21.

Braking Device

The braking device 22 outputs a braking torque (braking force) to be applied to the driver's vehicle 100 in order to brake the driver's vehicle 100. Examples of the braking device 22 include a brake. The braking device 22 is electrically connected to the ECU 90. The ECU 90 can control the braking torque to be output from the braking device 22 by controlling operation of the braking device 22.

Steering Device

The steering device 23 steers the driver's vehicle 100. In this example, the steering device 23 includes a power steering device 231 and a reaction force actuator 232. The power steering device 231 outputs a steering torque (steering force) for steering the driver's vehicle 100. The reaction force actuator 232 applies a reaction force (steering reaction force) to a steering wheel operation when a force for rotating a steering wheel 35 is applied to the steering wheel 35. The power steering device 231 and the reaction force actuator 232 are electrically connected to the ECU 90. The ECU 90 can control the steering torque to be output from the power steering device 231 by controlling operation of the power steering device 231. The ECU 90 can control the steering reaction force by controlling operation of the reaction force actuator 232.

Sensors and Other Devices

The driver's vehicle 100 further includes an accelerator pedal 31, an accelerator pedal operation amount sensor 32, a brake pedal 33, a brake pedal operation amount sensor 34, the steering wheel 35, a steering shaft 36, a steering angle sensor 37, a steering torque sensor 38, a vehicle speed detection device 51, a peripheral information detection device 60, and a road information detection device 70.

Accelerator Pedal Operation Amount Sensor

The accelerator pedal operation amount sensor 32 detects an operation amount of the accelerator pedal 31. The accelerator pedal operation amount sensor 32 is electrically connected to the ECU 90. The accelerator pedal operation amount sensor 32 transmits information on the detected operation amount of the accelerator pedal 31 to the ECU 90. The ECU 90 acquires the operation amount of the accelerator pedal 31 as an accelerator pedal operation amount AP based on the information. The ECU 90 acquires a requested driving torque (requested driving force) based on the accelerator pedal operation amount AP and a driver's vehicle speed V described later (traveling speed of the driver's vehicle 100). The ECU 90 controls the operation of the driving device 21 such that the requested driving torque is output from the driving device 21.

Brake Pedal Operation Amount Sensor

The brake pedal operation amount sensor 34 detects an operation amount of the brake pedal 33. The brake pedal operation amount sensor 34 is electrically connected to the ECU 90. The brake pedal operation amount sensor 34 transmits information on the detected operation amount of the brake pedal 33 to the ECU 90. The ECU 90 acquires the operation amount of the brake pedal 33 as a brake pedal operation amount BP based on the information. The ECU 90 acquires a requested braking torque (requested braking force) based on the brake pedal operation amount BP. The ECU 90 controls the operation of the braking device 22 such that the requested braking force is output from the braking device 22.

Steering Angle Sensor

The steering angle sensor 37 detects a rotation angle of the steering shaft 36 with respect to a neutral position. The steering angle sensor 37 is electrically connected to the ECU 90. The steering angle sensor 37 transmits information on the detected rotation angle of the steering shaft 36 to the ECU 90. The ECU 90 acquires the rotation angle of the steering shaft 36 as a steering angle θ based on the information.

Steering Torque Sensor

The steering torque sensor 38 detects a torque input to the steering shaft 36 by the driver DR via the steering wheel 35. The steering torque sensor 38 is electrically connected to the ECU 90. The steering torque sensor 38 transmits information on the detected torque to the ECU 90. The ECU 90 acquires the torque input to the steering shaft 36 by the driver DR via the steering wheel 35 (driver input torque) based on the information. The ECU 90 acquires a requested steering torque based on the steering angle θ, the driver input torque, and the driver's vehicle speed V (traveling speed of the driver's vehicle 100). The ECU 90 controls operation of the steering device 23 such that the requested steering torque is output from the steering device 23.

Vehicle Speed Detection Device

The vehicle speed detection device 51 detects a vehicle speed of the driver's vehicle 100 (driver's vehicle speed V). Examples of the vehicle speed detection device 51 include a wheel speed sensor. The vehicle speed detection device 51 is electrically connected to the ECU 90. The vehicle speed detection device 51 transmits information on the detected vehicle speed of the driver's vehicle 100 to the ECU 90. The ECU 90 acquires the driver's vehicle speed V based on the information.

Peripheral Information Detection Device

The peripheral information detection device 60 detects information on the periphery of the driver's vehicle 100. In this example, the peripheral information detection device 60 includes a radio wave sensor 61 and an image sensor 62. Examples of the radio wave sensor 61 include a radar sensor (such as a millimeter wave radar). Examples of the image sensor 62 include a camera. The peripheral information detection device 60 may include an acoustic wave sensor such as an ultrasonic sensor (clearance sonar) or an optical sensor such as a laser radar (light detection and ranging (LiDAR)).

Radio Wave Sensor

The radio wave sensor 61 is electrically connected to the ECU 90. The radio wave sensor 61 emits a radio wave, and receives the radio wave reflected by an object (reflected wave). The radio wave sensor 61 transmits information (detection result) related to the emitted radio wave and the received radio wave (reflected wave) to the ECU 90. In other words, the radio wave sensor 61 detects an object present around the driver's vehicle 100, and transmits information (detection result) related to the detected object to the ECU 90. The ECU 90 can acquire information related to the object present around the driver's vehicle 100 (peripheral detection information IS) based on the information (radio wave information). In this example, the object is a vehicle, a motorcycle, a bicycle, a person, or the like.

Image Sensor

The image sensor 62 is electrically connected to the ECU 90. The image sensor 62 captures an image around the driver's vehicle 100, and transmits information related to the captured image to the ECU 90. The ECU 90 can acquire information related to the periphery of the driver's vehicle 100 (peripheral detection information IS) based on the information (camera image information IC).

Road Information Detection Device

The road information detection device 70 includes a global positioning system (GPS) device 71 and a map information database 72.

GPS Device

The GPS device 71 receives a so-called GPS signal. The GPS device 71 is electrically connected to the ECU 90. The GPS device 71 transmits the received GPS signal to the ECU 90. The ECU 90 acquires the GPS signal via the GPS device 71. The ECU 90 can acquire a current position P100 of the driver's vehicle 100 based on the acquired GPS signal.

Map Information Database

The map information database 72 stores map information including "information related to regulated speed" and "information related to road type". The map information database 72 is electrically connected to the ECU 90. The ECU 90 can acquire information related to a road where the driver's vehicle 100 is currently traveling from the current position P100 of the driver's vehicle 100 (road information IR).

Outline of Operation of Vehicle Steering Control Device

Next, an outline of operation of the vehicle steering control device 10 will be described.

When driving the driver's vehicle 100 along a curved road, the driver DR rotates the steering wheel 35 clockwise or counterclockwise. When driving the driver's vehicle 100 along a sharply curved road, the driver DR needs to rotate the steering wheel 35 more quickly than when driving the driver's vehicle 100 along a gently curved road. If the reaction force to be applied to the steering wheel 35 from the reaction force actuator 232 in response to the steering wheel operation (steering reaction force) is constant between the case where the driver DR drives the driver's vehicle 100 along a sharply curved road and the case where the driver DR drives the driver's vehicle 100 along a gently curved road, the steering wheel operation may delay when the driver DR drives the driver's vehicle 100 along the sharply curved road. That is, there is a possibility that the driver DR cannot smoothly drive the driver's vehicle 100 along a curved road.

In view of the above, the vehicle steering control device 10 adjusts a timing to change the steering reaction force based on a curvature of a curved road where the driver DR intends to drive the driver's vehicle 100 so that the driver DR can smoothly drive the driver's vehicle 100 along the curved road.

More specifically, the vehicle steering control device 10 determines whether the driver's vehicle 100 is predicted to enter a curved road based on camera image information IC and/or road information IR while the driver's vehicle 100 is traveling.

When the vehicle steering control device 10 determines that the driver's vehicle 100 is predicted to enter the curved road, the vehicle steering control device 10 acquires or estimates a minimum curve radius (curve radius R) of the curved road based on the road information IR and/or the camera image information IC. In this example, when acquiring the curve radius R based on the road information IR, the vehicle steering control device 10 compares a current position P100 of the driver's vehicle 100 determined from a GPS signal and map information stored in the map information database 72. The vehicle steering control device 10 specifies a road where the driver's vehicle 100 is traveling, and reads a curve radius R stored in association with the road from the map information database 72. In this manner, the vehicle steering control device 10 acquires the curve radius R. When acquiring the curve radius R based on the camera image information IC, the vehicle steering control device 10 acquires, by estimation, the curve radius R from image information of a driver's vehicle traveling road RD ahead of the driver's vehicle 100 that is obtained based on the camera image information IC.

When the curve radius R is acquired, the vehicle steering control device 10 acquires, as a gaze point curvature p, a curvature of the driver's vehicle traveling road RD at a point ahead of the driver's vehicle 100 at which the driver DR facing the curved road having the curve radius R is presumed to gaze. When the acquired curve radius R is small, the vehicle steering control device 10 acquires, as the gaze point curvature p, a curvature of the driver's vehicle traveling road RD at a farther point ahead of the driver's vehicle 100 than the point when the curve radius R is large.

Figure 2A:
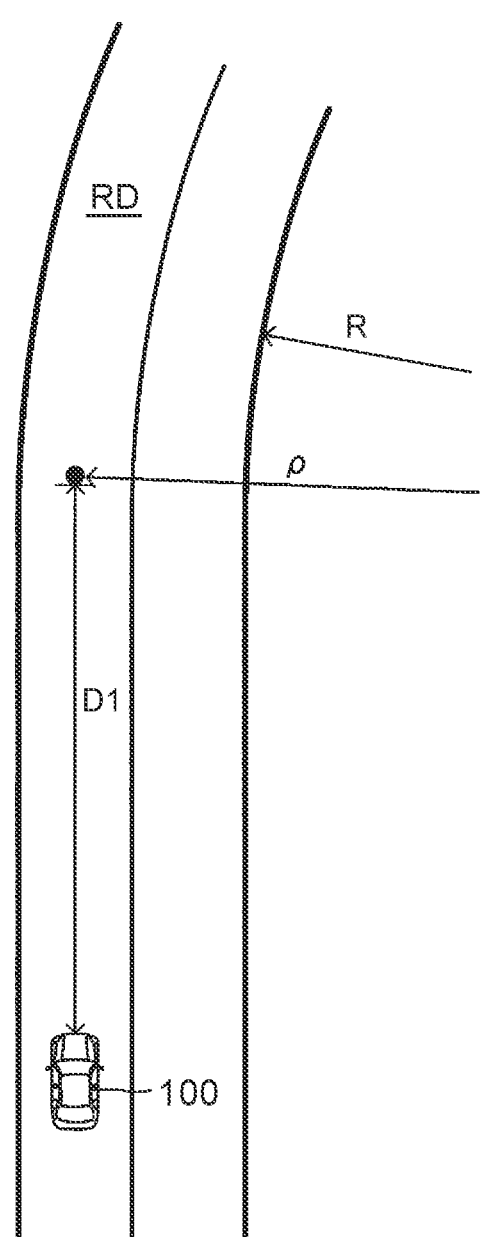
FIG. 2A is a diagram showing a scene in which the driver's vehicle enters a gently curved road.
Figure 2B:
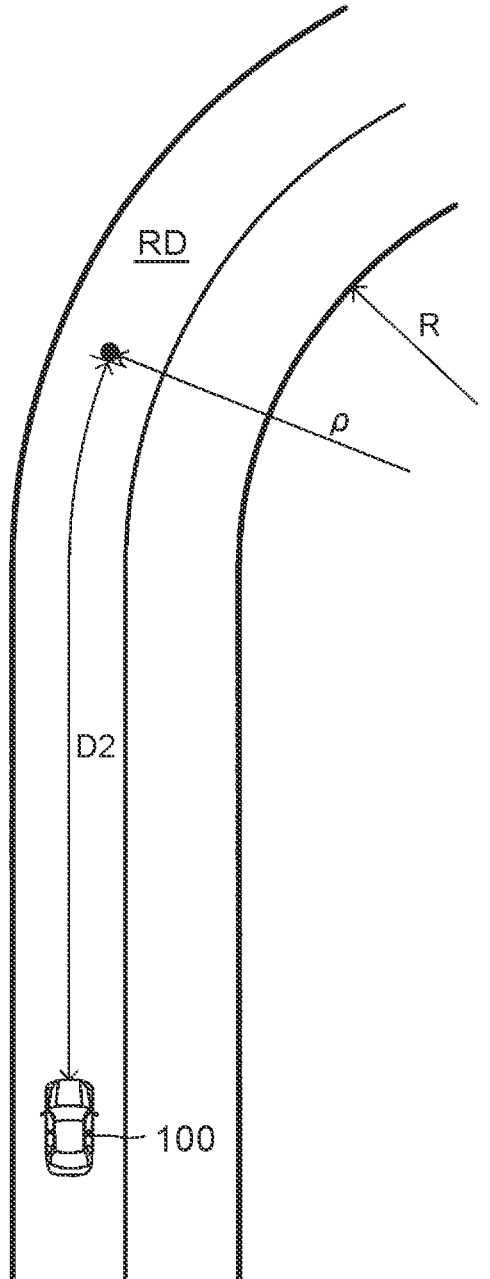
FIG. 2B is a diagram showing a scene in which the driver's vehicle enters a sharply curved road.

For example, when the curve radius R is large as shown in FIG. 2A (that is, when the curved road that the driver's vehicle 100 is predicted to enter is a gently curved road), the vehicle steering control device 10 acquires, as the gaze point curvature p, a curvature of the driver's vehicle traveling road RD ahead of the driver's vehicle 100 at a first distance D1. On the other hand, when the curve radius R is small as shown in FIG. 2B (that is, when the curved road that the driver's vehicle 100 is predicted to enter is a sharply curved road), the vehicle steering control device 10 acquires, as the gaze point curvature p, a curvature of the driver's vehicle traveling road RD ahead of the driver's vehicle 100 at a second distance D2. The second distance D2 is longer than the first distance D1. Therefore, when the acquired curve radius R is small, the vehicle steering control device 10 acquires, as the gaze point curvature p, the curvature of the driver's vehicle traveling road RD at a farther point ahead of the driver's vehicle 100 than the point when the acquired curve radius R is large.

When the gaze point curvature p is acquired, the vehicle steering control device 10 controls the operation of the reaction force actuator 232 to apply a smaller steering reaction force to the steering wheel operation as the acquired gaze point curvature p increases.

More specifically, the vehicle steering control device 10 acquires, by calculation, a target value of the steering reaction force (target steering reaction force Ftgt) to be applied to the steering wheel operation by the reaction force actuator 232 as described below. Then, the vehicle steering control device 10 controls the operation of the reaction force actuator 232 to apply the acquired target steering reaction force Ftgt to the steering wheel operation.

First, when the curve radius R is acquired, the vehicle steering control device 10 determines the presence or absence of strain based on the curve radius R and a driver's vehicle speed V at that time. The degree of strain in this example indicates a point ahead of the driver's vehicle 100 (forward gaze point) at which the driver DR is presumed to gaze when the driver DR causes the driver's vehicle 100 to enter the curved road. When determination is made that the degree of strain is high (that is, when determination is made that strain is present), the degree of strain indicates that the forward gaze point is a relatively far point ahead of the driver's vehicle 100. When determination is made that the degree of strain is low (that is, when determination is made that strain is not present), the degree of strain indicates that the forward gaze point is a relatively near point ahead of the driver's vehicle 100.

Figure 3:
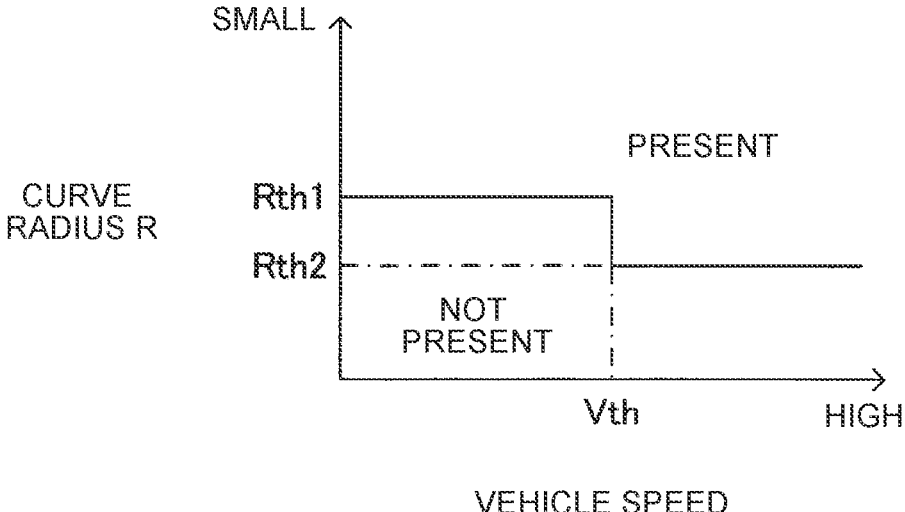
FIG. 3 is a diagram showing the presence or absence of strain to be determined based on a traveling speed of the driver's vehicle (driver's vehicle speed) and a curve radius.

As shown in FIG. 3, the vehicle steering control device 10 determines that strain is not present when the driver's vehicle speed V is in a range lower than a predetermined vehicle speed Vth and the curve radius R is larger than a predetermined value (first radius Rth1). The vehicle steering control device 10 determines that strain is present when the driver's vehicle speed V is in the range lower than the predetermined vehicle speed Vth and the curve radius R is equal to or smaller than the first radius Rth1. The vehicle steering control device 10 determines that strain is not present when the driver's vehicle speed V is in a range equal to or higher than the predetermined vehicle speed Vth and the curve radius R is larger than a predetermined value (second radius Rth2) larger than the first radius Rth1. The vehicle steering control device 10 determines that strain is present when the driver's vehicle speed V is in the range equal to or higher than the predetermined vehicle speed Vth and the curve radius R is equal to or smaller than the second radius Rth2.

In the example described herein, the vehicle steering control device 10 determines the presence or absence of strain based on both the driver's vehicle speed V and the curve radius R, but may determine the presence or absence of strain based only on the curve radius R.

When the presence or absence of strain determined, the vehicle steering control device 10 estimates how far ahead the driver DR is gazing at the point on the driver's vehicle traveling road RD based on the presence or absence of strain. That is, the vehicle steering control device 10 acquires a distance (forward gaze distance D) from the driver's vehicle 100 to the point at which the driver DR is presumed to gaze (forward gaze point) by calculation based on Arithmetic Expression 1.

$$D = V \times T \qquad (1)$$

In Expression 1, "V" represents the driver's vehicle speed V. In Expression 1, "T" represents a forward gaze period.

When the vehicle steering control device 10 determines that strain is not present, the vehicle steering control device 10 sets a predetermined period (first period T1) as the forward gaze period T. When the vehicle steering control device 10 determines that strain is present, the vehicle steering control device 10 sets a predetermined period (second period T2) as the forward gaze period T. The second period T2 is longer than the first period T1. Therefore, the forward gaze distance D acquired when determination is made that strain is present is longer than the forward gaze distance D acquired when determination is made that strain is not present.

When the forward gaze distance D is acquired, the vehicle steering control device 10 acquires a curvature of the driver's vehicle traveling road RD ahead of the driver's vehicle 100 at the forward gaze distance D (gaze point curvature p) by using the camera image information IC and/or the road information IR. Since the forward gaze distance D when strain is present is longer than the forward gaze distance D when strain is not present as described above, the gaze point curvature ρ acquired when strain is present tends to be larger than the gaze point curvature ρ acquired when strain is not present.

When the gaze point curvature ρ is acquired, the vehicle steering control device 10 acquires a guide steering angle θg by calculation based on Arithmetic Expression 2.

$$\theta g = n \times K \times (1 + A \times V^2) \times L \times \rho \qquad (2)$$

In Expression 2, "n" represents a gear ratio of a steering box. The symbol "K" represents a coefficient (adapted value) obtained by experiments or the like so that the guide steering angle θg to be acquired based on Expression 2 is acquired as a value at which the driver's vehicle 100 can smoothly travel along a curved road. The symbol "A" represents a so-called stability factor. The symbol "V" represents the driver's vehicle speed. The symbol "L" represents a wheelbase of the driver's vehicle 100.

When the guide steering angle θg is acquired, the vehicle steering control device 10 acquires a difference between the guide steering angle θg and an actual steering angle θ at that time (steering angle difference Δθ) by calculation based on Arithmetic Expression 3.

$$\Delta\theta = \theta g - \theta \qquad (3)$$

When the steering angle difference Δθ is acquired, the vehicle steering control device 10 sets the target steering reaction force Ftgt to a smaller value as the steering angle difference Δθ increases. The vehicle steering control device 10 controls the operation of the reaction force actuator 232 to apply the set target steering reaction force Ftgt to the steering wheel operation. The vehicle steering control device 10 may store a map in which the steering angle difference Δθ and the target steering reaction force Ftgt are associated with each other. In the map, the target steering reaction force Ftgt may be a smaller value as the steering angle difference Δθ increases. The vehicle steering control device 10 may determine the target steering reaction force Ftgt from the acquired steering angle difference Δθ and the map.

Effects

Figure 4A:
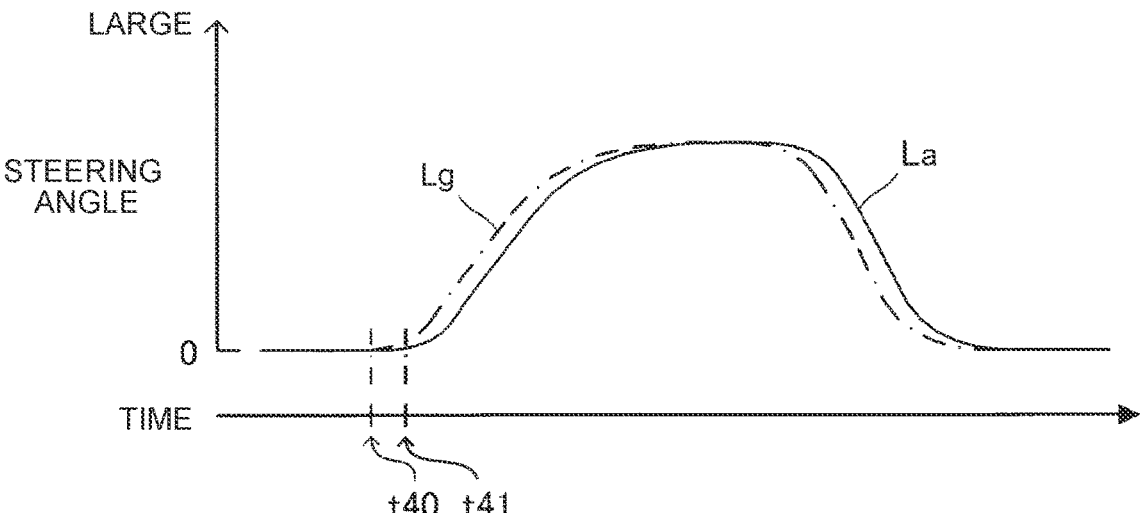
FIG. 4A is a diagram showing a relationship between a guide steering angle and an actual steering angle in the scene in which the driver's vehicle enters the gently curved road.

With the vehicle steering control device 10, when the driver's vehicle 100 is predicted to enter a gently curved road, the acquired guide steering angle θg changes as shown in FIG. 4A. In FIG. 4A, a line Lg indicates a change in the guide steering angle θg, and a line La indicates a change in the actual steering angle θ. In FIG. 4A, the guide steering angle θg starts to increase from zero at a time t40, and the actual steering angle θ starts to increase from zero at a time t41. That is, the guide steering angle θg that is a steering angle at the point ahead of the driver's vehicle 100 at the forward gaze distance D starts to change at a timing earlier than that of the actual steering angle θ.

Figure 4B:
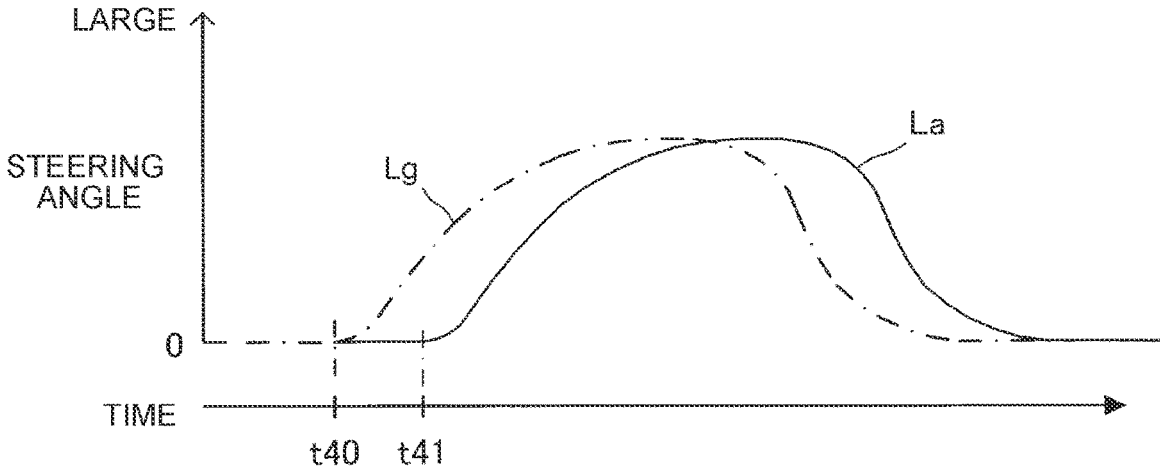
FIG. 4B is a diagram showing a relationship between the guide steering angle and the actual steering angle in the scene in which the driver's vehicle enters the sharply curved road.

When the driver's vehicle 100 is predicted to enter a sharply curved road, the acquired guide steering angle θg changes as shown in FIG. 4B. In FIG. 4B, a line Lg indicates a change in the guide steering angle θg, and a line La indicates a change in the actual steering angle θ. In FIG. 4B, the guide steering angle θg starts to increase from zero at a time t40, and the actual steering angle θ starts to increase from zero at a time t41.

Comparison between the change in the guide steering angle θg shown in FIG. 4A and the change in the guide steering angle θg shown in FIG. 4B demonstrates that, when the curved road that the driver's vehicle 100 is predicted to enter is a sharply curved road, the guide steering angle θg increases at a timing earlier than that when the curved road is a gently curved road. More specifically, when the curved road that the driver's vehicle 100 is predicted to enter is a sharply curved road, the forward gaze distance D (distance D2) is set longer than the forward gaze distance D (distance D1) when the curved road is a gently curved road (see FIGS. 2A and 2B). Therefore, the guide steering angle θg at the point ahead of the driver's vehicle 100 at the distance D2 starts to change at a timing earlier than that of the guide steering angle θg at the point ahead of the driver's vehicle 100 at the distance D1. Thus, when the curved road that the driver's vehicle 100 is predicted to enter is a sharply curved road, a steering reaction force F is reduced at a timing earlier than that when the curved road is a gently curved road. Accordingly, when the driver's vehicle 100 approaches a sharply curved road and the driver DR starts to rotate the steering wheel 35, the steering reaction force F has already been reduced. Therefore, the driver DR can quickly rotate the steering wheel 35. As a result, even if the curved road is a sharply curved road, the driver DR can smoothly drive the driver's vehicle 100 along the curved road. Thus, the vehicle steering control device 10 can adjust the timing to change the steering reaction force so that the driver DR can smoothly drive the driver's vehicle 100 along the curved road.

When the curved road that the driver's vehicle 100 is predicted to enter is a sharply curved road, the guide steering angle θg increases or decreases in advance of the change in the actual steering angle θ while the driver's vehicle 100 is traveling along the curved road. Therefore, even if the curved road is a sharply curved road, the driver's vehicle 100 can smoothly travel along the curved road.

When the curved road that the driver's vehicle 100 is predicted to enter is a gently curved road, the guide steering angle θg increases or decreases in analogy to the change in the actual steering angle θ while the driver's vehicle 100 is traveling along the curved road. Therefore, the steering reaction force is adjusted in analogy to that for an actual steering wheel rotation operation of the driver DR.

Specific Operation of Vehicle Steering Control Device

Next, specific operation of the vehicle steering control device 10 will be described. The CPU of the ECU 90 of the vehicle steering control device 10 executes a routine shown in FIG. 5 in a predetermined calculation cycle. At a predetermined timing, the CPU starts a process from Step S500 in FIG. 5, and advances the process to Step S505. In Step S505, the CPU determines whether strain is present.

When the CPU determines "Yes" in Step S505, the CPU advances the process to Step S510. In Step S510, the CPU sets the forward gaze period T to the second period T2. Next, the CPU advances the process to Step S515 to acquire the forward gaze distance D by the calculation based on Arithmetic Expression 1 using the forward gaze period T set in Step S510. Next, the CPU advances the process to Step S520 to acquire the gaze point curvature ρ as described above by using the forward gaze distance D acquired in Step S515. Next, the CPU advances the process to Step S525 to acquire the guide steering angle θg by the calculation based on Arithmetic Expression 2 using the gaze point curvature ρ acquired in Step S520. Next, the CPU advances the process to Step S550 to acquire the steering angle difference Δθ by the calculation based on Arithmetic Expression 3 using the guide steering angle θg acquired in Step S525. Next, the CPU advances the process to Step S555 to acquire the target steering reaction force Ftgt as described above by using the steering angle difference Δθ acquired in Step S550. Next, the CPU advances the process to Step S560 to control the operation of the reaction force actuator 232 such that the target steering reaction force Ftgt acquired in Step S555 is achieved. Then, the CPU advances the process to Step S595 to temporarily terminate this routine.

When the CPU determines "No" in Step S505, the CPU advances the process to Step S530. In Step S530, the forward gaze period T is set to the first period T1. Next, the CPU advances the process to Step S535 to acquire the forward gaze distance D by the calculation based on Arithmetic Expression 1 using the forward gaze period T set in Step S530. Next, the CPU advances the process to Step S540 to acquire the gaze point curvature ρ as described above by using the forward gaze distance D acquired in Step S535. Next, the CPU advances the process to Step S545 to acquire the guide steering angle θg by the calculation based on Arithmetic Expression 2 using the gaze point curvature ρ acquired in Step S540. Next, the CPU advances the process to Step S550 to acquire the steering angle difference Δθ by the calculation based on Arithmetic Expression 3 using the guide steering angle θg acquired in Step S545. Next, the CPU advances the process to Step S555 to acquire the target steering reaction force Ftgt as described above by using the steering angle difference Δθ acquired in Step S550. Next, the CPU advances the process to Step S560 to control the operation of the reaction force actuator 232 such that the target steering reaction force Ftgt acquired in Step S555 is achieved. Then, the CPU advances the process to Step S595 to temporarily terminate this routine.

The above is the specific operation of the vehicle steering control device 10.

Modification

The vehicle steering control device 10 may adjust, in the following manner, the timing to change the steering reaction force based on a curvature of a curved road where the driver DR intends to drive the driver's vehicle 100 so that the driver DR can smoothly drive the driver's vehicle 100 along the curved road.

That is, when the driver's vehicle 100 is predicted to enter a curved road, the vehicle steering control device 10 according to a modification of the embodiment of the present disclosure sets, as a target pattern, a pattern of a change in the steering angle for causing the driver's vehicle 100 to suitably travel along the curved road. The vehicle steering control device 10 sets a guide steering angle θg for guiding the steering wheel operation of the driver DR to achieve the change in the steering angle θ along the target pattern when the driver's vehicle 100 travels along the curved road. The vehicle steering control device 10 may be configured to reduce the steering reaction force when the actual steering angle θ is smaller than the guide steering angle θg. The vehicle steering control device 10 may be configured to increase the steering reaction force when the actual steering angle θ is larger than the guide steering angle θg.

Particularly in this example, the steering angle θ along the target pattern (target steering angle θtgt) is represented by Expression 4. In Expression 4, "t" represents a time at which the driver DR starts to rotate the steering wheel 35 from a neutral position to drive the driver's vehicle 100 along the curved road (steering wheel operation start time). Therefore, in Expression 4, "f(t)" represents a function whose variable is the steering wheel operation start time t. The time at which the driver DR starts to rotate the steering wheel 35 from a neutral position (steering wheel operation start time) may be predicted based on a GPS signal, map information, and the driver's vehicle speed by the vehicle steering control device 10. The steering wheel operation start time is an example of "steering operation start time.

$$\theta tgt = f(t) \tag{4}$$

In this example, the guide steering angle θg is acquired (set) from Expression 5. In Expression 5, "t" represents the steering wheel operation start time. The symbol "τ" represents a period (preview period) for advancing the time to start the setting of the guide steering angle θg. The symbol "a" represents a gain.

$$\theta g = a \times f(t-\tau) \tag{5}$$

In this example, the preview period τ is set based on the curve radius R and the driver's vehicle speed V. In particular, the preview period τ is acquired from Expression 6. In Expression 6, "R" represents the curve radius. The symbol "V" represents the driver's vehicle speed. The symbol "H(R, V)" represents a function whose variables are the curve radius R and the driver's vehicle speed V.

$$\tau = H(R, V) \tag{6}$$

With Expression 6, when the curve radius R is small, a longer preview period τ is acquired as compared with a case where the curve radius R is large. That is, a longer preview period τ is acquired as the curve radius R decreases. With Expression 6, when the curve radius R is larger than zero, a preview period τ larger than zero is acquired. With Expression 6, when the driver's vehicle speed V is high, a longer preview period τ is acquired as compared with a case where the driver's vehicle speed V is low. That is, a longer preview period τ is acquired as the driver's vehicle speed V increases.

In this example, the gain "a" is set based on the curve radius R and the driver's vehicle speed V. In particular, the gain "a" is acquired from Expression 7. In Expression 7, "R" represents the curve radius. The symbol "V" represents the driver's vehicle speed. The symbol "G(R, V)" represents a function whose variables are the curve radius R and the driver's vehicle speed V.

$$a = G(R, V) \tag{7}$$

With Expression 7, when the curve radius R is small, a gain "a" having a smaller value is acquired as compared with the case where the curve radius R is large. That is, a gain "a" having a smaller value is acquired as the curve radius R decreases. With Expression 7, when the driver's vehicle speed V is high, a larger gain "a" is acquired as compared with the case where the driver's vehicle speed V is low. That is, a larger gain "a" is acquired as the driver's vehicle speed V increases. The gain "a" acquired from Expression 7 is a value larger than zero, and equal to or smaller than "1". With Expression 7, when the curve radius R is larger than zero, at least a gain "a" smaller than "1" is acquired.

A linear expression, a quadratic expression, or a sigmoid function can be used as each of the function H(R, V) and the function G(R, V). Alternatively, each of the function H(R, V) and the function G(R, V) may be stored in the form of a map (or a look-up table), and the preview period τ and the gain "a" may be acquired by applying the curve radius R and the driver's vehicle speed V to the map. Alternatively, the presence or absence of strain may be determined based on the driver's vehicle speed V and the curve radius R as described above. A relatively short period may be set as the preview period τ when strain is not present, and a period longer than that period may be set as the preview period τ when strain is present.

Figure 6A:
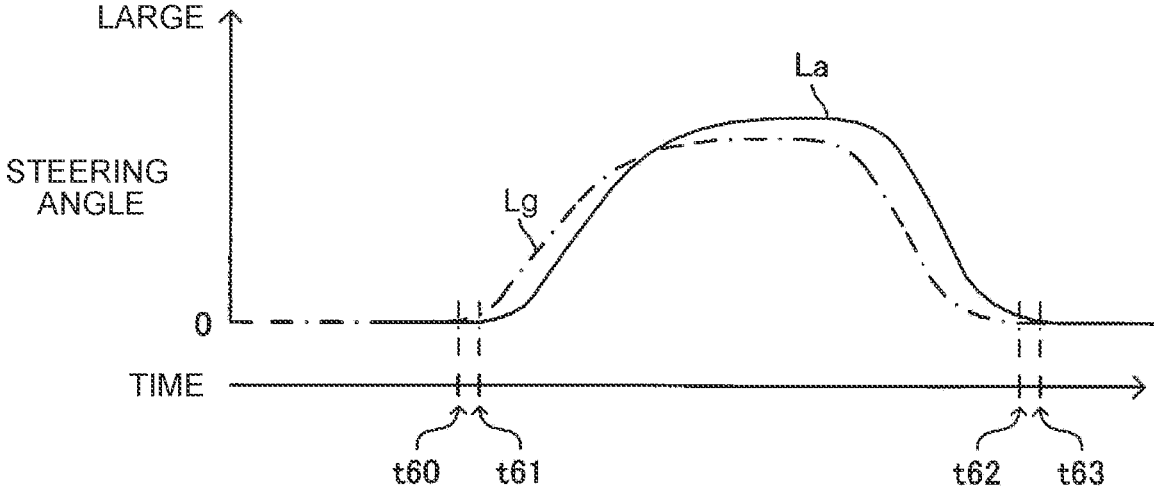
FIG. 6A is a diagram showing changes in the guide steering angle and a target steering angle to be set when the curve radius is large and the driver's vehicle speed is low.
Figure 6B:
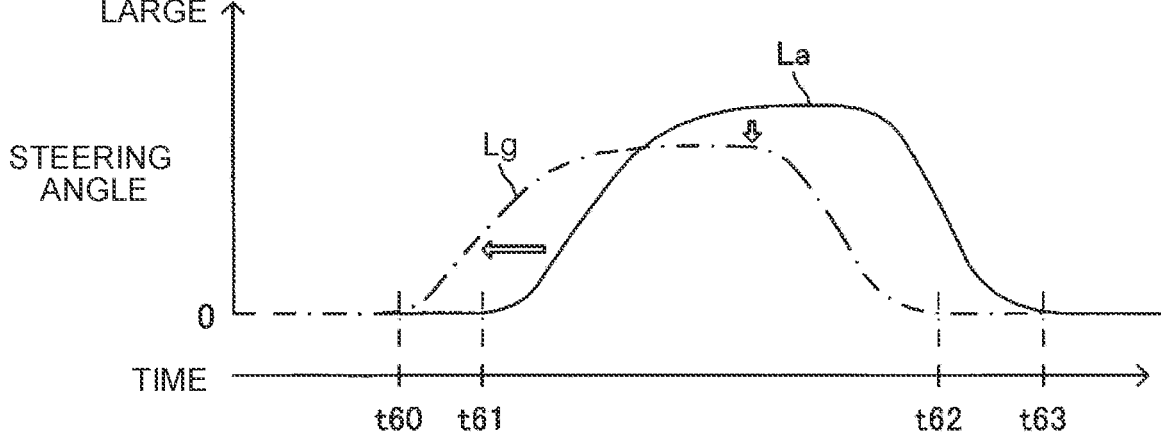
FIG. 6B is a diagram showing changes in the guide steering angle and the target steering angle to be set when the curve radius is small and the driver's vehicle speed is high.

The target steering angle θtgt acquired from Expression 4 starts to be larger than zero at a time t61 (steering wheel operation start time t) as indicated by a line La in FIGS. 6A and 6B. With an elapse of time, the target steering angle θtgt gradually increases, reaches its maximum value, then gradually decreases, and reaches zero at a time t63 at which the driver's vehicle 100 finishes traveling along the curved road.

The guide steering angle θg acquired from Expression 5 starts to be larger than zero at a time t60 earlier than the time t61 (steering wheel operation start time t) as indicated by a line Lg in FIGS. 6A and 6B. With an elapse of time, the guide steering angle θg gradually increases, reaches its maximum value θmax, then gradually decreases, and reaches zero at a time t62 earlier than the time t63 at which the driver's vehicle 100 finishes traveling along the curved road.

In this example described above, when a curved road is detected and the curve radius R of the curved road is acquired, a preview period τ larger than zero is set. Therefore, the setting of the guide steering angle θg is started at the time t60 earlier than the steering wheel operation start time t (time t61). In other words, the guide steering angle θg is larger than zero from the time t60 earlier than the steering wheel operation start time t (time t61).

In this example, when a curved road is detected and the curve radius R of the curved road is acquired, a gain "a" smaller than "1" is set. Therefore, the maximum value θmax of the guide steering angle θg is smaller than the maximum value of the target steering angle θtgt.

When the curve radius R is small, the preview period τ is set longer than that when the curve radius R is large. Therefore, when the curve radius R is small, the time t60 at which the setting of the guide steering angle θg is started is earlier than the steering wheel operation start time t (time t61) as compared with the case where the curve radius R is large.

When the driver's vehicle speed V is high, the preview period τ is set longer than that when the driver's vehicle speed V is low. Therefore, when the driver's vehicle speed V is high, the time t60 at which the setting of the guide steering angle θg is started is earlier than the steering wheel operation start time t (time t61) as compared with the case where the driver's vehicle speed V is low.

When the curve radius R is small, the gain "a" is set to a smaller value than that when the curve radius R is large. Therefore, when the curve radius R is small, the maximum value θmax of the guide steering angle θg is set to a smaller value than that when the curve radius R is large.

When the driver's vehicle speed V is high, the gain "a" is set to a larger value than that when the driver's vehicle speed V is low. Therefore, when the driver's vehicle speed V is high, the maximum value θmax of the guide steering angle θg is set to a larger value than that when the driver's vehicle speed V is low.

From the above, the guide steering angle θg changes with the elapse of time as indicated by the line Lg in FIG. 6A when the curve radius R is large and the driver's vehicle speed V is high. The guide steering angle θg changes with the elapse of time as indicated by the line Lg in FIG. 6B when the curve radius R is small and the driver's vehicle speed V is low.

When the guide steering angle θg is set and the actual steering angle θ is smaller than the guide steering angle θg, the vehicle steering control device 10 sets the steering reaction force to be smaller than a reference steering reaction force as the difference of the actual steering angle θ from the guide steering angle θg (steering angle difference Δθ) increases.

When the actual steering angle θ is larger than the guide steering angle θg, the vehicle steering control device 10 sets the steering reaction force to be larger than the reference steering reaction force as the difference of the actual steering angle θ from the guide steering angle θg (steering angle difference Δθ) increases.

The above is the outline of the operation of the vehicle steering control device 10 according to the modification of the embodiment of the present disclosure.

When the steering reaction force is reduced at the time at which the driver DR starts the steering wheel operation for driving the driver's vehicle 100 along the curved road (steering wheel operation start time), the driver DR can easily operate the steering wheel for driving the driver's vehicle 100 along the curved road. However, there is a possibility that the steering wheel operation delays and the driver's vehicle 100 cannot suitably travel along the curved road.

With the vehicle steering control device 10 of this example, the setting of the guide steering angle θg (guide steering operation amount) is started at the timing earlier than the steering wheel operation start time (steering operation start time). As a result, the steering reaction force is reduced at an earlier timing. Therefore, even when the curve radius R is small (when the degree of curve of the curved road is high), the steering wheel operation (steering operation) for causing the driver's vehicle 100 to travel along the curved road can be performed without delay. As a result, the driver's vehicle 100 can suitably travel along the curved road.

When the curve radius R is small, the driver DR needs to operate the steering wheel more greatly to drive the driver's vehicle 100 along the curved road. Therefore, there is a strong possibility that the steering wheel operation of the driver DR delays.

With the vehicle steering control device 10 of this example, when the curve radius R is small, the preview period τ (predetermined period) for advancing the timing to start the setting of the guide steering angle θg is set to a long period. Therefore, the setting of the guide steering angle θg is started at a timing earlier than the timing at which the driver DR starts the steering wheel operation for driving the driver's vehicle 100 along the curved road. As a result, the steering reaction force is reduced at an earlier timing. Thus, it is possible to suppress the delay in the steering wheel operation of the driver DR. While the driver's vehicle 100 is traveling along the curved road, the actual steering angle θ changes in agreement (or substantially in agreement) with the target steering angle θtgt. Accordingly, the driver's vehicle 100 can suitably travel along the curved road.

When the driver's vehicle speed V (traveling speed of the driver's vehicle 100) is high, the driver DR needs to operate the steering wheel more quickly to drive the driver's vehicle 100 along the curved road. Therefore, there is a strong possibility that the steering wheel operation of the driver DR delays.

With the vehicle steering control device 10 of this example, when the driver's vehicle speed V is high, the preview period τ for advancing the timing to start the setting of the guide steering angle θg is set to a long period. Therefore, the setting of the guide steering angle θg is started at a timing earlier than the timing at which the driver DR starts the steering wheel operation for driving the driver's vehicle 100 along the curved road. As a result, the steering reaction force is reduced at an earlier timing. Thus, it is possible to suppress the delay in the steering wheel operation of the driver DR. While the driver's vehicle 100 is traveling along the curved road, the actual steering angle θ changes in agreement (or substantially in agreement) with the target steering angle θtgt. Accordingly, the driver's vehicle 100 can suitably travel along the curved road.

When driving the driver's vehicle 100 along the curved road, the driver DR increases the steering angle θ (amount of steering operation) and then reduces the steering angle θ. When the steering angle θ approaches the maximum value of the target steering angle θtgt (target steering operation amount) defined by the target pattern, the steering angle θ may exceed this maximum value.

With the vehicle steering control device 10 of this example, the maximum value θmax of the guide steering angle θg is limited to a value smaller than the maximum value of the target steering angle θtgt by a predetermined value. Therefore, when the steering angle θ approaches the maximum value of the target steering angle θtgt, the steering reaction force is increased. Thus, it is possible to reduce the occurrence of a case where the steering wheel operation of the driver DR exceeds the maximum value of the target steering angle θtgt. While the driver's vehicle 100 is traveling along the curved road, the actual steering angle θ changes in agreement (or substantially in agreement) with the target steering angle θtgt. Accordingly, the driver's vehicle 100 can suitably travel along the curved road.

When the driver's vehicle speed V is high, the driver DR needs to operate the steering wheel more greatly to drive the driver's vehicle 100 along the curved road. Therefore, the steering angle θ tends to increase.

With the vehicle steering control device 10 of this example, when the driver's vehicle speed V is high, the predetermined value for reducing the maximum value θmax of the guide steering angle θg below the maximum value of the target steering angle θtgt is set to a small value. Therefore, when the steering angle θ approaches the maximum value of the target steering angle θtgt in a state in which the driver's vehicle speed V is high, the degree of increase in the steering reaction force is reduced. Thus, it is possible to appropriately reduce the occurrence of the case where the steering angle θ exceeds the maximum value of the target steering angle θtgt. While the driver's vehicle 100 is traveling along the curved road, the actual steering angle θ changes in agreement (or substantially in agreement) with the target steering angle θtgt. Accordingly, the driver's vehicle 100 can suitably travel along the curved road.

When the curve radius R is small, the driver DR needs to operate the steering wheel more greatly to drive the driver's vehicle 100 along the curved road. Therefore, there is a strong possibility that the steering angle θ exceeds the maximum value of the target steering angle θtgt defined by the target pattern.

With the vehicle steering control device 10 of this example, when the curve radius R is small, the predetermined value for reducing the maximum value θmax of the guide steering angle θg below the maximum value of the target steering angle θtgt is set to a large value. Therefore, when the steering angle θ approaches the maximum value of the target steering angle θtgt in a state in which the curve radius R is small, the degree of increase in the steering reaction force is increased. Thus, it is possible to appropriately reduce the occurrence of the case where the steering angle θ exceeds the maximum value of the target steering angle θtgt. While the driver's vehicle 100 is traveling along the curved road, the actual steering angle θ changes in agreement (or substantially in agreement) with the target steering angle θtgt. Accordingly, the driver's vehicle 100 can suitably travel along the curved road.

Specific Operation of Vehicle Steering Control Device of Modification

Figure 7:
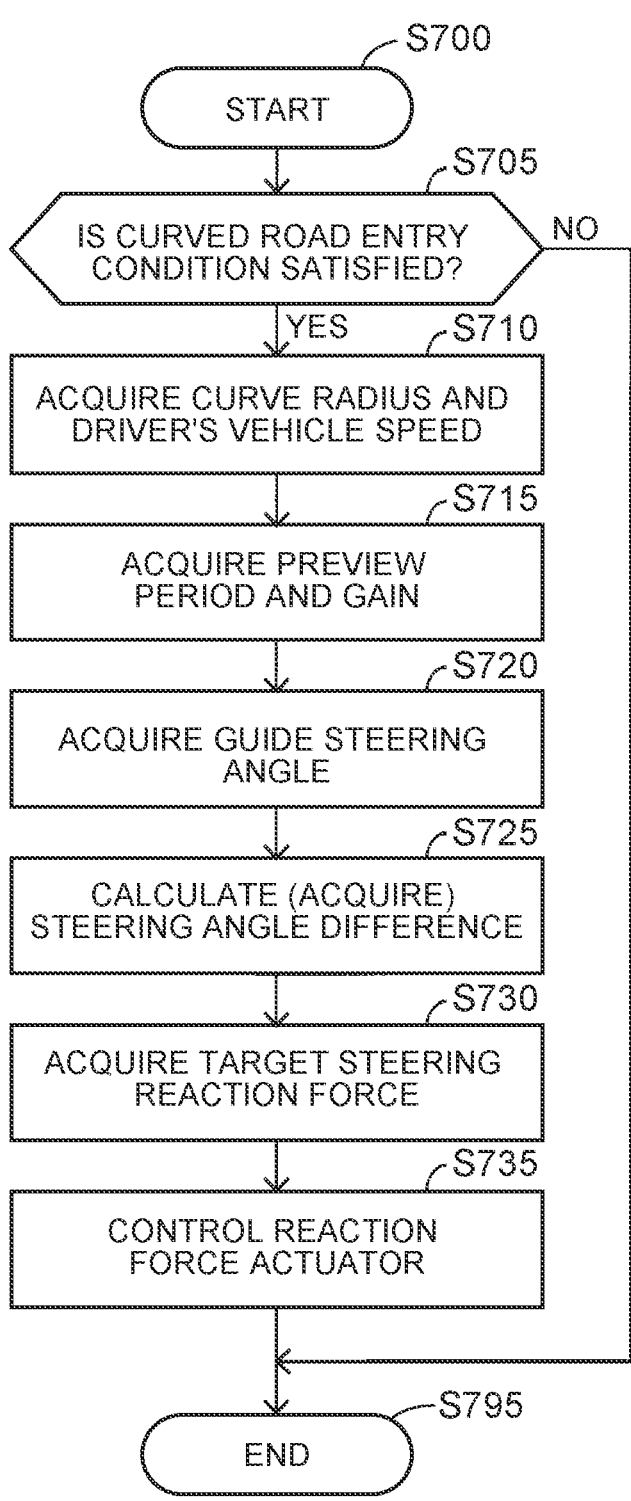
FIG. 7 is a flowchart showing a routine to be executed by the vehicle steering control device according to a modification of the embodiment of the present disclosure.

Next, specific operation of the vehicle steering control device 10 according to the modification of the embodiment of the present disclosure will be described. The CPU of the ECU 90 of the vehicle steering control device 10 executes a routine shown in FIG. 7 in a predetermined calculation cycle. At a predetermined timing, the CPU starts a process from Step S700 in FIG. 7, and advances the process to Step S705. In Step S705, the CPU determines whether a curved road entry condition is satisfied.

The curved road entry condition is a condition that a curved road that the driver's vehicle 100 is predicted to enter within a predetermined period is detected. Therefore, the curved road entry condition is satisfied when such a curved road is detected, and is then unsatisfied when the driver's vehicle 100 finishes traveling along the curved road. Thus, the curved road entry condition is satisfied while the driver's vehicle 100 is traveling along the curved road after the curved road is detected, and is unsatisfied otherwise. The CPU may determine whether the curved road entry condition is satisfied based on a GPS signal and map information.

When the CPU determines "Yes" in Step S705, the CPU advances the process to Step S710. In Step S710, the CPU acquires the curve radius R and the driver's vehicle speed V. Next, the CPU advances the process to Step S715 to acquire the preview period τ and the gain "a" by applying the curve radius R and the driver's vehicle speed V acquired in Step S710 to Expressions 6 and 7. Next, the CPU advances the process to Step S720 to acquire the guide steering angle θg by applying the preview period τ and the gain "a" acquired in Step S715 to Expression 5.

Next, the CPU advances the process to Step S725 to acquire the difference between the guide steering angle θg acquired in Step S720 and the actual steering angle θ

(steering angle difference Δθ). Next, the CPU advances the process to Step S730 to acquire the target steering reaction force Ftgt based on the steering angle difference Δθ acquired in Step S725. Next, the CPU advances the process to Step S735 to control the operation of the reaction force actuator 232 to apply, to the steering wheel 35, a steering reaction force corresponding to the target steering reaction force Ftgt acquired in Step S730. Next, the CPU advances the process to Step S795 to temporarily terminate this routine.

When the CPU determines "No" in Step S705, the CPU directly advances the process to Step S795 to temporarily terminate this routine.

The above is the specific operation of the vehicle steering control device 10 according to the modification of the embodiment of the present disclosure. The vehicle steering control device 10 may include one or more processors.

The present disclosure is not limited to the embodiment described above, and a variety of modifications can be adopted within the scope of the present disclosure.

What is claimed is:

1. A vehicle steering control device comprising:
   a control device configured to:
      acquire information on a curved road ahead of a driver's vehicle in a traveling direction, wherein the information on the curved road includes a curve radius;
      set a predetermined guide steering angle based on the information on the curved road;
      after the predetermined guide steering angle has been set, control a power steering device of the driver's vehicle to start to increase a guide steering angle from zero to the predetermined guide steering angle earlier in time as the curve radius of the curved road becomes smaller;
      after the guide steering angle starts to increase to the predetermined guide steering angle, acquire an actual steering angle being performed by a driver of the driver's vehicle; and
      apply a steering reaction force based on a difference between the guide steering angle and the actual steering angle being performed by the driver.

2. The vehicle steering control device according to claim 1, wherein the control device is configured to, as a traveling speed of the driver's vehicle becomes higher, control the guide steering angle to start to increase from zero earlier in time.

3. The vehicle steering control device according to claim 1, wherein the control device is configured to:
   set a target for a change in the actual steering angle while the driver's vehicle travels along the curved road; and
   limit a maximum value of the predetermined guide steering angle to a value smaller by a predetermined value than a maximum value of the actual steering angle that changes in accordance with the target.

4. A vehicle steering control device comprising:
   acquire information on a curved road ahead of a driver's vehicle in a traveling direction;
   set a predetermined guide steering angle based on the information on the curved road;
   set the steering reaction force based on a difference between the guide steering operation amount and an actual amount of the steering operation performed by the driver; and
   after the predetermined guide steering angle has been set, control a power steering device of the driver's vehicle to start to increase a guide steering angle from zero to the predetermined guide steering angle earlier in time as a speed of the driver's vehicle becomes higher;

after the guide steering angle starts to increase to the predetermined guide steering angle, acquire an actual steering angle being performed by a driver of the driver's vehicle; and apply a steering reaction force based on a difference between the guide steering angle and the actual steering angle being performed by the driver.

* * * * *